United States Patent
Jean et al.

(10) Patent No.: US 7,326,136 B2
(45) Date of Patent: Feb. 5, 2008

(54) HOCKEY STICK BLADE AND A METHOD OF MAKING THEREOF

(75) Inventors: Marcel Jean, Drummondville (CA); Daniel Gatien, Drummondville (CA); Remi Lussier, Drummondville (CA); Carol Ladouceur, Gatineau (CA); Germain Belanger, St-Germain-de-Grantham (CA)

(73) Assignee: 2946-6380 Quebec Inc., Quebec (CA)

( * ) Notice: Subject to any disclaimer, the term of this patent is extended or adjusted under 35 U.S.C. 154(b) by 0 days.

(21) Appl. No.: 11/255,813

(22) Filed: Oct. 21, 2005

(65) Prior Publication Data
US 2006/0089215 A1    Apr. 27, 2006

(30) Foreign Application Priority Data
Oct. 21, 2004   (CA) .................................. 2485694

(51) Int. Cl.
*A63B 59/14* (2006.01)

(52) U.S. Cl. ........................................ 473/563

(58) Field of Classification Search ......... 473/560–563
See application file for complete search history.

(56) References Cited

U.S. PATENT DOCUMENTS

| 4,488,721 | A | 12/1984 | Franck et al. |
| 5,407,195 | A | 4/1995 | Tiitola et al. |
| 5,836,841 | A | 11/1998 | Fell |
| 6,918,847 | B2 | 7/2005 | Gans et al. |
| 7,008,338 | B2 * | 3/2006 | Pearson ....................... 473/563 |
| 2003/0004019 | A1 * | 1/2003 | Lussier et al. .............. 473/563 |
| 2004/0198538 | A1 * | 10/2004 | Goldsmith et al. ......... 473/563 |

FOREIGN PATENT DOCUMENTS

| CA | 1043379 | 11/1978 |
| CA | 2123248 | 10/1995 |
| CA | 2200663 | 9/1997 |
| CA | 2228104 | 9/1998 |
| CA | 2244610 | 2/1999 |
| CA | 2294301 | 1/2000 |
| CA | 2326966 | 6/2001 |
| CA | 2337302 | 8/2001 |
| CA | 2351827 | 12/2002 |
| CA | 2365484 | 6/2003 |
| CA | 2460910 | 9/2004 |

OTHER PUBLICATIONS

Jofa 2004 Equipment Guide, Koho Crossover 2260C blade (p. 11 of Koho section) Jan. 2004.
Hespeler 2004 Hockey Collection, Hespeler alpha stick with Vybe blade insert (p. 6) Jan. 2004.

* cited by examiner

*Primary Examiner*—Mark S Graham
(74) *Attorney, Agent, or Firm*—Akerman Senterfitt

(57) ABSTRACT

There is provided a hockey stick blade and a method of making thereof, wherein the blade is made in a composite material comprising a core formed of light weight material, such as foam, and a fiber braid jacket or tubular prepreg cloth, the core being partially hollow to define longitudinal cavities inside the blade assembly.

14 Claims, 5 Drawing Sheets

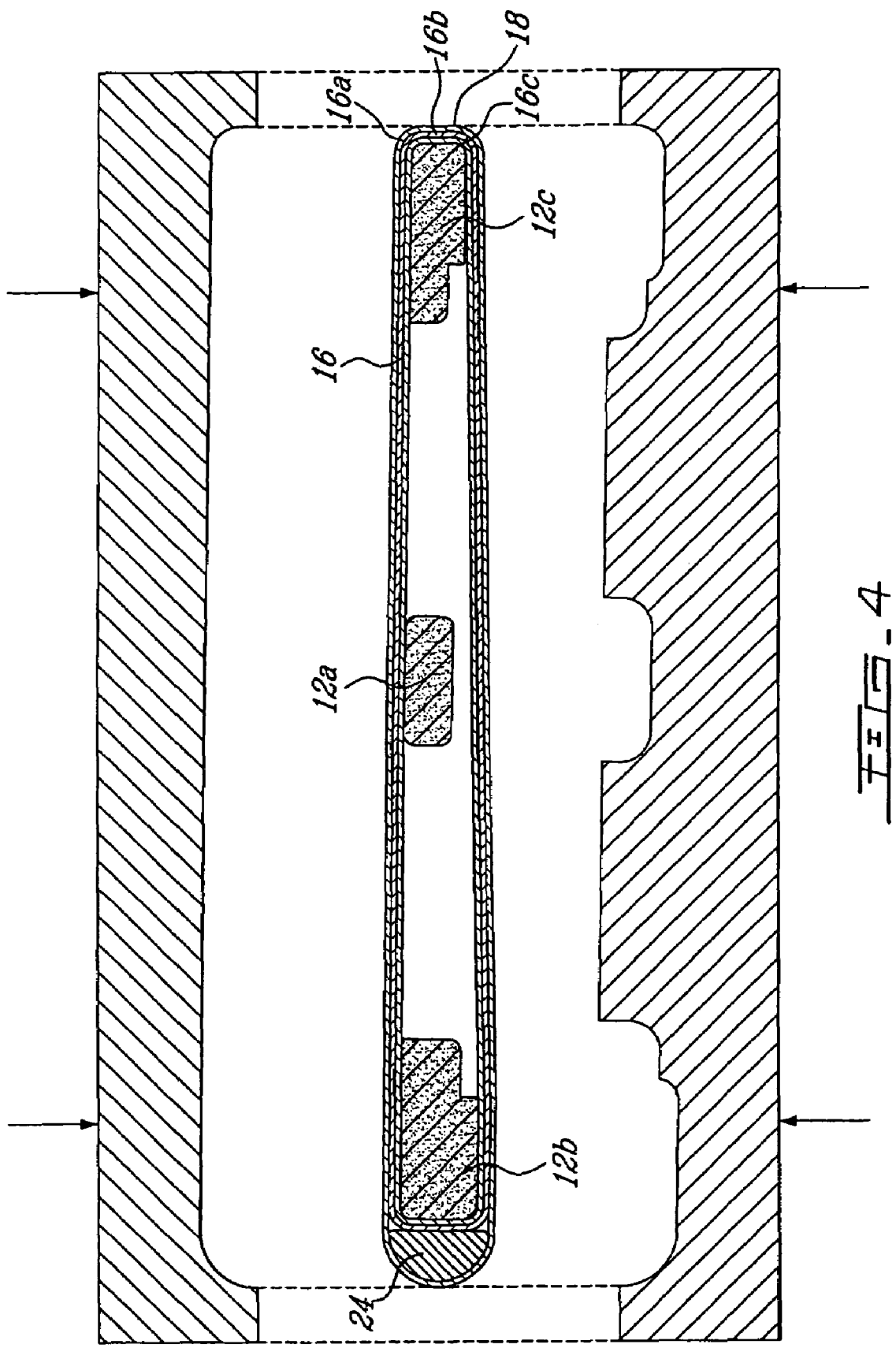

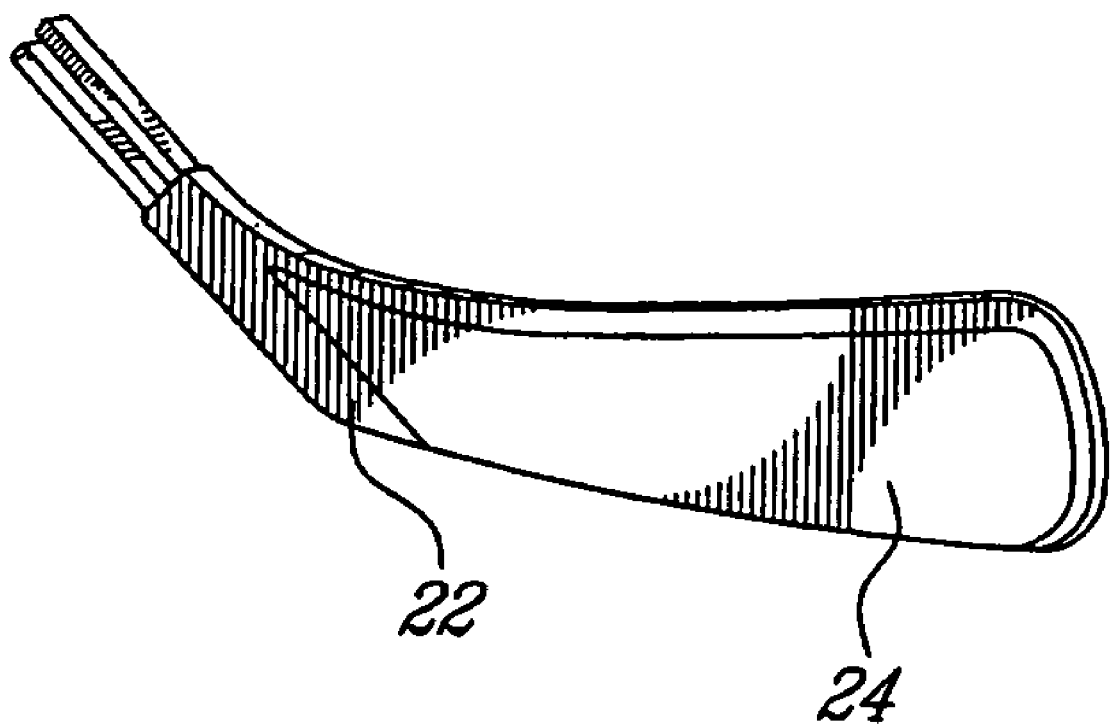
FIG_5

HOCKEY STICK BLADE AND A METHOD OF MAKING THEREOF

FIELD OF THE INVENTION

The present invention relates to hockey sticks. More specifically, the present invention is concerned with a hockey stick blade and a method of making such a blade.

BACKGROUND OF THE INVENTION

As is now well established in the art, the blade, as the hockey stick's striking surface, is a part submitted to extreme load conditions during shots like a slap shot, for example. The blade may be submitted to impact, torsion, bending, tension and shearing forces.

Current methods of making hockey stick blades tend to meet requirements resulting from such a range of forces to which the blades are submitted, by resorting to different types of structures, including for example, monobloc structures, sandwich structures and reinforced structures. Such methods yield blades having a weight essentially proportionate to the respective weight of the materials used, and usually fail to provide an optimized combination of minimum weight and maximum stiffness/strength.

For example, in the case of sandwich-type blades, a main weakness and a reduced service life are related to a non-satisfactory quality of the joining step or of the gluing step between a core and outer walls, thus resulting in a tendency to delaminate, peel or tear. As soon as peeling initiates, for example, the mechanical properties of the blade as a whole are reduced, thereby jeopardizing the quality of the hockey stick itself.

Efforts to optimize a long-term strength of sandwich-type blades have involved using braids around the core of the sandwich structure, which results in an effective increase of strength and life limit of so-called high-performance blades.

A method of fabricating such a high performance blade standardly comprises providing two longitudinal semi-cores made in foam, pulling on each semi-core a generally tubular jacket made of reinforcing fibers, pulling a third generally tubular jacket made of reinforcing fibers on the two semi-cores individually wrapped and located longitudinally side-by-side, and impregnating a resulting assembly with resin, thereby yielding a sandwich-type beam comprising a full core extending from a first edge to a second edge thereof across the whole width thereof. Then, a molding step yields a blade, the performances of which depend on the quality of the assembly between the two semi-cores and on an adhesion quality between the two semi-core assembly and outer walls. Such method may be found described in U.S. Pat. No. 6,918,847 issued Jul. 17, 2005 to Gans.

The above efforts still fail as far as the weight problem is concerned. A minimized weight is all the more critical since synthetic fibers now allow making increasingly light synthetic fibers shafts for hockey sticks. It has been noted that assembling a light shaft and a relatively heavy blade results in an unbalanced hockey stick, which is unacceptable in the field of high-performance hockey.

Therefore, there is need in the art for a hockey stick blade obviating the current drawbacks.

Conventional molding techniques used to fabricate composite blade for hockey stick comprising a core made of foam reinforced with layers of fibers of carbon, kevlar, polyethylene or glass are in general obtained by a close-mold process.

The pre-assembly of "the foam insert—reinforcing fibers" having the general shape of a straight hockey stick blade is positioned inside a two-part mold in which, in a second step, a liquid polymeric resin is injected under pressure and or vacuum. Under injection pressure and/or vacuum, the liquid resin will impregnate the entire pre-assembly of foam-carbon fibers and solidify after under chemical reaction, commonly called polymerization or cross-linking. The negative particularity of such molding technology is the fact that, when the pre-assembly of the foam insert around which the carbon fiber cloth or braid is positioned inside the cavity portion of the mold, there is no specific fiber strengthening or specific fiber alignment. The dry fiber clothe or braid is relatively loose and it is in this state that it will be resin impregnated after mold closing and resin injection, thus generating wrinkles, for example, and non uniform adherence with the foam core. Such situation results in a molded blade in which the continuous reinforcing fibers are not well aligned and relatively misoriented inside the solidified resin matrix.

The same situation exists when molders use "prepreg" instead of dry reinforcement. Prepreg is a form of material combining, in a semi-solidified state, fiber reinforcement and resin matrix, ready to mold only under pressure and heat in a close-mold process.

In this particular case, the fiber-braided envelope will be slid over the foam cores assembly and, after mold closing under pressure, only heat will be applied to solidify the blade assembly.

When, in use, the molded blade is put under stress, such as during a slap shot or equivalent, the not well aligned and/or not-straightened reinforcing fibers are not reacting instantaneously to generate the optimum or acceleration or impulse to the puck.

Under the striking or impact energy generated by the player, the molded blade will, in that particular situation, deflect more prior to absorb energy and finally react with less speed to kick the puck at the speed anticipated.

Therefore, molding hockey stick blades according to the conventional close-mold technology does not generate an optimum stiffness, which is a main factor required to totally convert the induced energy by the player into puck speed.

The extra blade deflection, when subjected to load and due to carbon fiber molded state (unstraightened and misoriented), is a serious handicap to optimize puck speed in a slap shot, for example.

SUMMARY OF THE INVENTION

The present invention concerns an improved hockey stick blade with added strength and/or stiffness and a method of making thereof.

The present invention therefore provides a hockey stick blade which comprises:
 a) a shaft connecting portion;
 b) a heel portion;
 c) a puck contacting portion consisting of
  i) a central core formed of light weight material defining longitudinal spaced apart sections defining longitudinal cavities therebetween;
  ii) a jacket of fiber braid wrapped around the core;
  iii) a polymeric material encapsulating the core and jacket to form a molded blade part having opposite sides; and
  iv) a cover plate of composite polymeric material secured to one of the opposite side faces of the molded blade.

The present invention is thus concerned in eliminating the above problems of misaligned and unstraightened continuous reinforcing fibers inside the molded laminate. This is achieved, instead of using a full size foam core (full height), by using a partly filled foam core defining longitudinal cavities inside the blade assembly.

When combining the partly filled foam core with fiber braids, the tubular jacket made of continuous fibers completely wraps the blade thus providing a continuity of fibers on the full perimeter of the blade while encapsulating the core parts located at specific localizations. Hence, this molded blade may be seen as comprising a central beam with localized longitudinal reinforcing ribs between the foam insert.

The added strength and/or stiffness to the molded blade is due to the following. The final braided tubular jacket is positioned over the foam core prior to be installed in the mold to receive its resin injection. Mold closing will generate a tensioning and an alignment of the fibers due to the presence of the longitudinal cavities inside the foam core. This phenomenon of tensioning the tubular jacket results from the fact that the molded jacket perimeter is 10 to 20% (depending on the location on the blade) longer than the exterior perimeter of a conventional blade assembly. This extra perimeter is obtained by an alignment effect because the reinforcing fibers of the laminate are continuous and cannot elastically stretch or deform axially. Under mold closing the fiber braids are forced inside the longitudinal cavities resulting in a pre-tensioning, straightening and a full contact with the foam core exterior surface.

More precisely, such fiber alignment results from a reorientation of the fiber braids being a particularity of that type of fiber weaving.

With the present invention, when the mold is closed over the foam-core assembly, the outer tubular braid will react by a braid alignment change to allow its penetration inside the longitudinal cavities requiring a larger circumference coverage than the one of a standard blade circumference. This concept of using the mold closing step to pre-tension and realign the wraparound continuous fibers results in reducing the area of foam core bonding surface and generating locally a direct liaison between the two blade laminates (front and rear surfaces) specifically located inside the core cavities.

It is well known in the composite sandwich structure industry that the main weakness of this type of construction is the potential debonding phenomenon between the laminate skins and the foam core. A conventional hockey blade composed of a full size foam core having, at its surfaces, a molded laminate will first fail by debonding and this phenomenon is directly related to the bonded area exposed to impact load and stresses.

Reducing the importance of the foam surface area and joining the front and rear laminate skins at specific localizations will improve blade performance. Also, the cavity area of the core now includes structural ribs due to the hardened laminate braid structure therein; hence, there is no weight penalty or localized weaknesses due to discontinuity of foam core.

When molded blades resulting from the present concept are put under impact load or high-speed flexural loading, the added rigidity of the blade allows immediate energy loading with minimum deflection to subsequently return (restitute) the maximum energy to the puck under speed (minimum loss of energy).

There is no soft deflection of blade due to misaligned or misoriented or unstraightened continuous fibers in the molded laminate, which is situation delaying energy build up prior to energy restitution.

This concept of using mold closing to force the outer braided fiber envelope to realign and stretch to its maximum capacity can be utilized with the following molding technology.

A) The pre-assembled envelope and foam cores are laid down in the mold prior to being impregnated with liquid resin and solidity.

B) The fiber envelope is in a prepreg state, which means that the resin matrix is already incorporated inside the fiber architecture, resin matrix in a semi-solid or semi-rigidified prior to be used for molding.

The present invention therefore concerns a method of making a hockey stick blade consisting of a shaft connecting portion, a heel portion and a puck contacting portion comprising the steps of:

a) sliding a fiber braided jacket over a core formed of light weight material and including longitudinal spaced apart sections defining a longitudinal cavities therebetween;

b) positionning the jacket with the foam core in a female part of a mold having the shape of a blade;

c) closing a male part of the mold whereby the fibers of the jacket are placed under tension and aligned during mold closing due to the presence of the longitudinal cavities inside the core;

d) injecting a polymeric material in the mold to impregnate the jacket;

e) applying heat and pressure to the mold containing the impregnated jacket to form, after curing and mold opening, a molded blade part having, on one side thereof, aligned and straightened fibers encapsulated therein; and f) securing a cover plate over said one side of the molded blade part.

Another method of making a blade in accordance with the present invention includes the following steps:

a) sliding a resin-impregnated fiber braided jacket or prepreg cloth over a core formed of light weight material and including longitudinal spaced apart sections defining a longitudinal cavities therebetween;

b) positionning the jacket or cloth with the core in a female part of a mold having the shape of a blade;

c) closing a male part of the mold whereby the fibers of the jacket or the cloth are placed under tension and aligned during mold closing due to the presence of the longitudinal cavities inside the core;

d) applying heat and pressure to the mold containing the impregnated jacket or cloth to form, after curing and mold opening, a molded blade part having aligned and straightened fibers encapsulated therein; and e) securing a cover plate over one side of the molded blade part.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 4 is a cross-sectional diagram showing the blade-making step prior to molding; and FIG. 5 is a perspective view of a hockey stick blade having a different cover plate.

DESCRIPTION OF EMBODIMENTS OF THE INVENTION

Figure 1:
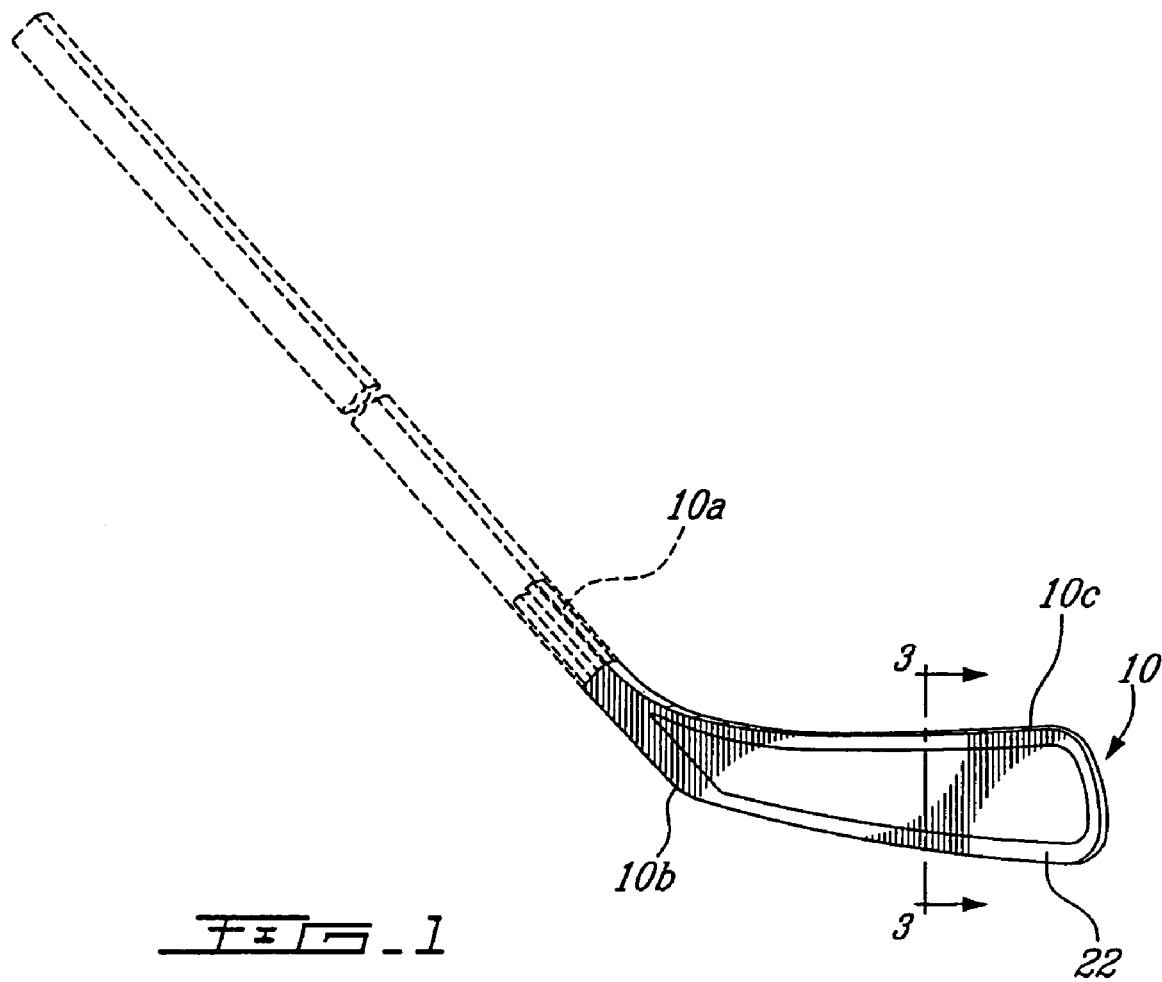
FIG. 1 is a general view of a hockey stick.
Figure 2:
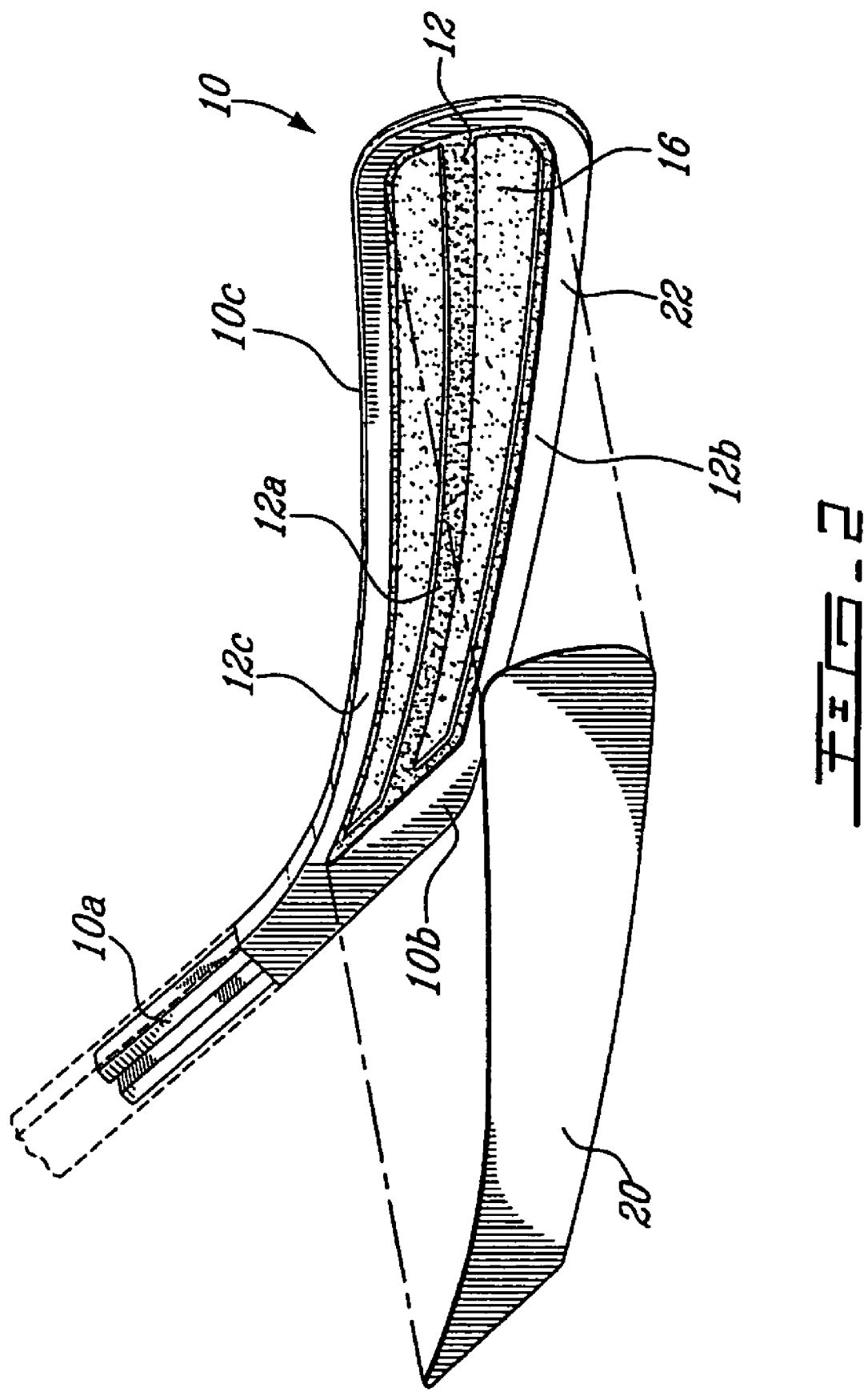
FIG. 2 is an exploded close-up view of the blade of the hockey stick of FIG. 1.

This present invention is concerned in providing a hockey stick blade 10 such as that illustrated in FIGS. 1 and 2 which is mounted to a hockey stick shaft 11. The blade 10 includes a shaft connecting portion 10a, a heel portion 10b and a puck contacting portion 10c.

Figure 3:
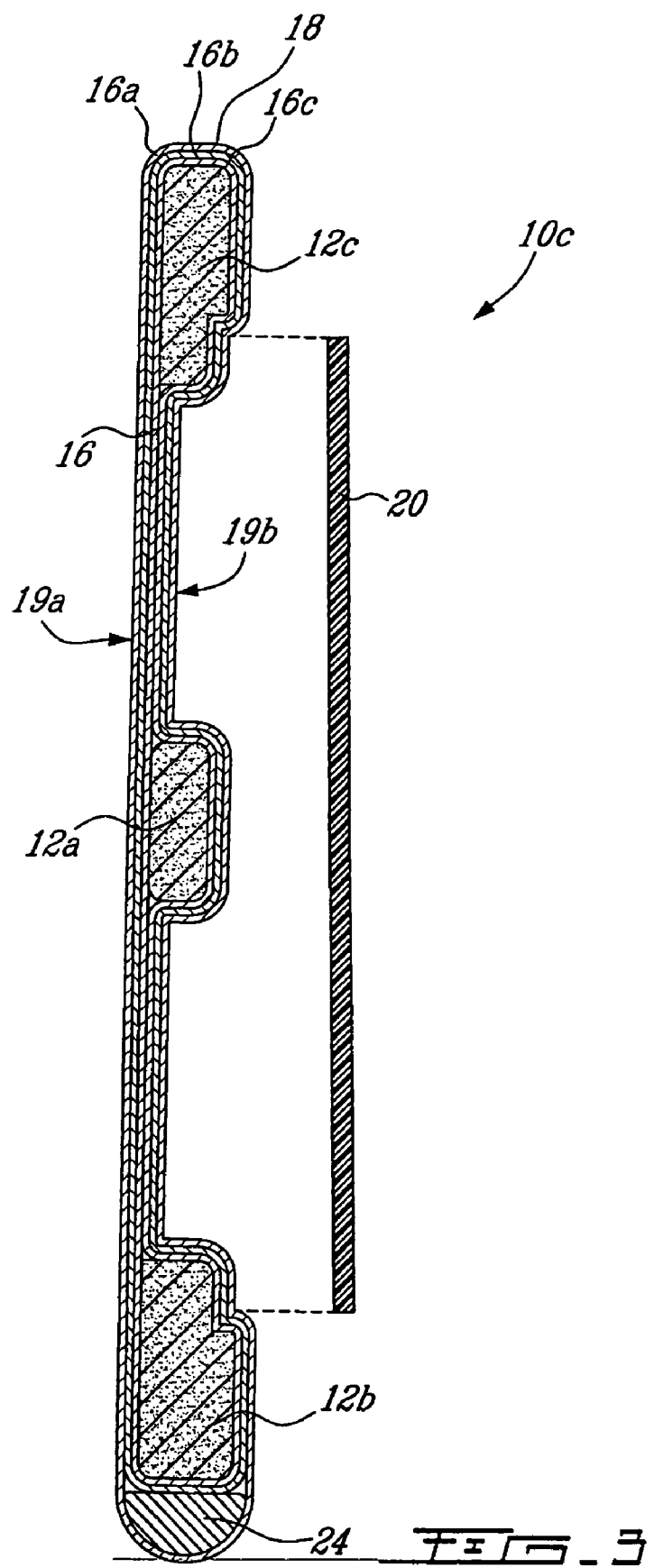
FIG. 3 is a cross section of the blade of the hockey stick of FIG. 1.

As illustrated also in FIG. 3, the puck contracting portion 10c comprises a core 12 formed of light weight material, such as low-density foam or carbon, and a tubular fiber braid jacket 16.

In the present embodiments, the core 12 is formed of three longitudinal spaced-apart sections 12a, 12b, 12c, onto which the fiber braid jacket 16 has been pulled or slid. Core section 12a is located at about the middle of the blade while core sections 12b and 12 are respectively located at the bottom and at the top of the blade. Each section may have a selected width. A combined height of these three sections may represent about half the height of the blade 10 as a whole. However, the number of core sections 12 may be varied and additional oblique core sections may be provided to connect the three longitudinal sections.

In the present embodiment, the tubular jacket 16 consists of a number of sleeves 16a, 16b, 16c of braided fibers having a predetermined bi- or tri-directional orientation. Such a jacket is known to protect the blade 10 against delaminating and/or peeling under multiple impacts during use, and to contribute to an increased strength thereof. Moreover, it provides an outer skin on one side of the blade 10 once molded.

The assembly of sleeves and core is encapsulated in a thermoset resin coating of polyester, vinyl ester, epoxy or urethane for example, thereby encapsulating the spaced-apart core sections to form a molded blade part having one side 19a representing one side face of the blade and one opposite side 19b having a discontinuous surface reinforced by longitudinal ribs in those area having a core section, but also inside the cavities where the thermoset sleeves are considered also as reinforcing ribs. The resulting blade part is characterized by a continuous distribution of the reinforcing fibers along a transverse section thereof.

A cover 20 is provided over the surface 19b of the blade. The cover 20, made in a thermoplastic or a thermoset fiber reinforced material, such as polycarbonate (PC) or polyvinyl chloride (PVC) or polypropylene (PP) for example, may be secured by gluing. Interestingly, it may have a texturized outer surface, with such a texture as of a diamond point-type or a sanded paper-type for example, thereby allowing an adjustment of the friction coefficient.

The cover may be tailored so as to slightly overlap a bottom edge 22 (see reference 24 in FIG. 5) of the blade, as an edge liner, thereby providing a protection against wear.

Preferably, a roving 24 is inserted between layers 16a and 16b to provide wear resistance along the edge 24.

One method of making the above-described blade in accordance with the present invention consists in providing a core of low-density foam, the core having a series of longitudinal sections defining longidutinal cavities therebetween; pulling a braid fiber jacket onto the core; compressing and impregnating the overall jacket containing the wrapped core with a thermoset resin, such as polyester, vinyl ester, urethane or epoxy for example, as known in the art; and finally securing over the thus molded blade a cover plate of wear resistant material. Securing may be done by gluing or otherwise.

The method may also comprise incorporating a member in a desired material, such as foam, or providing a foam core having oblique sections interconnecting the longitudinal core sections in the longitudinal cavities between the core sections to add rigidity if required.

The method of the present invention yields a blade having a foam core and a laminated wall, whereby an adhesion surface between the laminated wall and the foam core is reduced due to the discontinuity of the core along the height of the blade. Moreover, the laminated wall has an increased thickness between each core member, the core sections acting as longitudinal reinforcing ribs. The present method allows encapsulating each core section on four sides thereof, which results in an improved adhesion, further contributing to increasing resistance of the blade, in particular in the central region thereof.

The outer tubular jacket, made of a weaving of continuous or braid fibers, completely wraps the blade, providing a continuity of fiber on a perimeter of the blade, while encapsulating the core sections located at target locations. This blade may be seen as a central beam with localized longitudinal reinforcing ribs.

The resulting blade proves to be more resistant to repeated impacts, more resistant to combined torsion and impact as well as to delaminating, peeling and tearing, while lighter in weight than current blades.

Although the present invention has been described hereinabove by way of embodiments thereof, it may be modified, without departing from the nature and teachings of the subject invention as defined in the appended claims. For example, the cavities could receive an additional element of material, liquid or granular, to generate an anti-vibration effect or a center-of-gravity displacement effect.

What is claimed is:

1. A hockey stick blade, comprising:
   a) a shaft connecting portion;
   b) a heel portion;
   c) a puck contacting portion consisting of
      i) a partly filled core formed of light weight material defining longitudinal spaced apart sections defining longitudinal cavities therebetween;
      ii) a jacket formed of a number of braid fiber sleeves, fibers of said jacket having a predetermined directional orientation, said jacket being first pulled over said core sections and said longitudinal cavities to form a jacketed assembly, said jacketed assembly being then tensioned by applying a mold to said jacketed assembly, said tensioned jacketed assembly completely wrapping said spaced apart core sections;
      iii) a polymeric material encapsulating said tensioned jacketed assembly to form a molded blade part having opposite side faces, including a side face with a discontinuous surface; and
      iv) a cover plate of composite polymeric material secured to said side face with a discontinuous surface of said molded blade;
   said jacket providing a continuity of fibers on a full perimeter of the blade while encapsulating the spaced apart core sections, and forming said side face opposite said side face with a discontinuous surface.

2. A hockey stick blade as defined in claim 1, wherein said core is formed of low-density foam.

3. A hockey stick blade as defined in claim 1, wherein a combined height of said core sections is about half that of said blade.

4. A hockey stick blade as defined in claim 1, wherein said fibers of said jacket are bi-directionally oriented.

5. A hockey stick blade as defined in claim 1, wherein said fibers of said jacket are tri-directionally oriented.

6. A hockey stick blade as defined in claim 1, further comprising additional core sections in one or more of said cavities.

7. A hockey stick blade as defined in claim 1, further comprising a roving between two of said number of sleeves along a bottom edge of said blade.

8. A hockey stick as defined in claim 1, wherein said fibers are made of a material selected from a group including carbon, Kevlar, polyethylene, glass and a carbon/Kevlar hybrid.

9. A hockey stick blade as defined in claim 1, wherein said composite polymeric material is thermoplastic.

10. A hockey stick blade as defined in claim 1, wherein said composite polymeric material is thermoset.

11. A hockey stick blade as defined in claim 1, wherein said core encapsulating polymeric material is a thermoset resin.

12. A hockey stick blade as defined in claim 1, further comprising filler elements in said cavities.

13. A hockey stick blade as defined in claim 1, wherein fiber braids of said jacket are pre-tensioned, aligned, and in full contact with said core exterior surface.

14. The hockey stick blade of claim 1, wherein said opposite side faces of the blade are locally in direct liaison inside the core cavities.

* * * * *